(12) United States Patent
Welsh et al.

(10) Patent No.: US 7,815,840 B2
(45) Date of Patent: Oct. 19, 2010

(54) MODULAR MOLD SYSTEM AND RELATED METHOD

(75) Inventors: James Welsh, Gateshead (GB); Graham Goodge, Sudbury (GB)

(73) Assignee: Ace Mold Company, Ltd., Kwai Chung (CN)

( * ) Notice: Subject to any disclaimer, the term of this patent is extended or adjusted under 35 U.S.C. 154(b) by 56 days.

(21) Appl. No.: 12/331,618

(22) Filed: Dec. 10, 2008

(65) Prior Publication Data

US 2010/0140845 A1    Jun. 10, 2010

(51) Int. Cl.
*B29C 45/26* (2006.01)

(52) U.S. Cl. .................. 264/328.8; 425/195; 425/549

(58) Field of Classification Search ............. 264/328.8, 264/328.14–328.16; 425/549, 570, 272, 425/190, 195
See application file for complete search history.

(56) References Cited

U.S. PATENT DOCUMENTS

| | | | | |
|---|---|---|---|---|
| 5,032,078 A * | 7/1991 | Benenati | ............... | 425/549 |
| 5,114,330 A * | 5/1992 | Nielsen | ............... | 425/193 |
| 5,429,492 A * | 7/1995 | Taniyama | ............... | 425/556 |
| 5,587,188 A * | 12/1996 | Hepler | ............... | 425/549 |
| 7,500,843 B2 * | 3/2009 | Crain et al. | ............... | 425/185 |
| 2004/0258787 A1 * | 12/2004 | Olaru et al. | ............... | 425/143 |
| 2009/0324771 A1 * | 12/2009 | Kloeppel et al. | ............... | 425/549 |

* cited by examiner

*Primary Examiner*—Jill L Heitbrink
(74) *Attorney, Agent, or Firm*—Garrett IP, L.L.C.

(57) ABSTRACT

A modular mold system includes a hot half and a cold half. The hot half has a heated distributor assembly to receive molding material from an injection molding machine. The distributor assembly has a forward side that is opposite a side of the distributor assembly that faces the injection molding machine. A plurality of heated multi-nozzle units may also be provided. Each multi-nozzle unit has a manifold and a plurality of forward-extending nozzles. Each multi-nozzle unit is individually forwardly removably fastened to the forward side of the distributor assembly and removable from the distributor assembly while the distributor assembly is fastened to the first platen. The cold half includes a mounting plate and a plurality of cold-side units associated with the multi-nozzle units. Each cold-side unit is removably fastened to the mounting plate and engagable with one of the multi-nozzle units to define the one or more mold cavities.

12 Claims, 16 Drawing Sheets

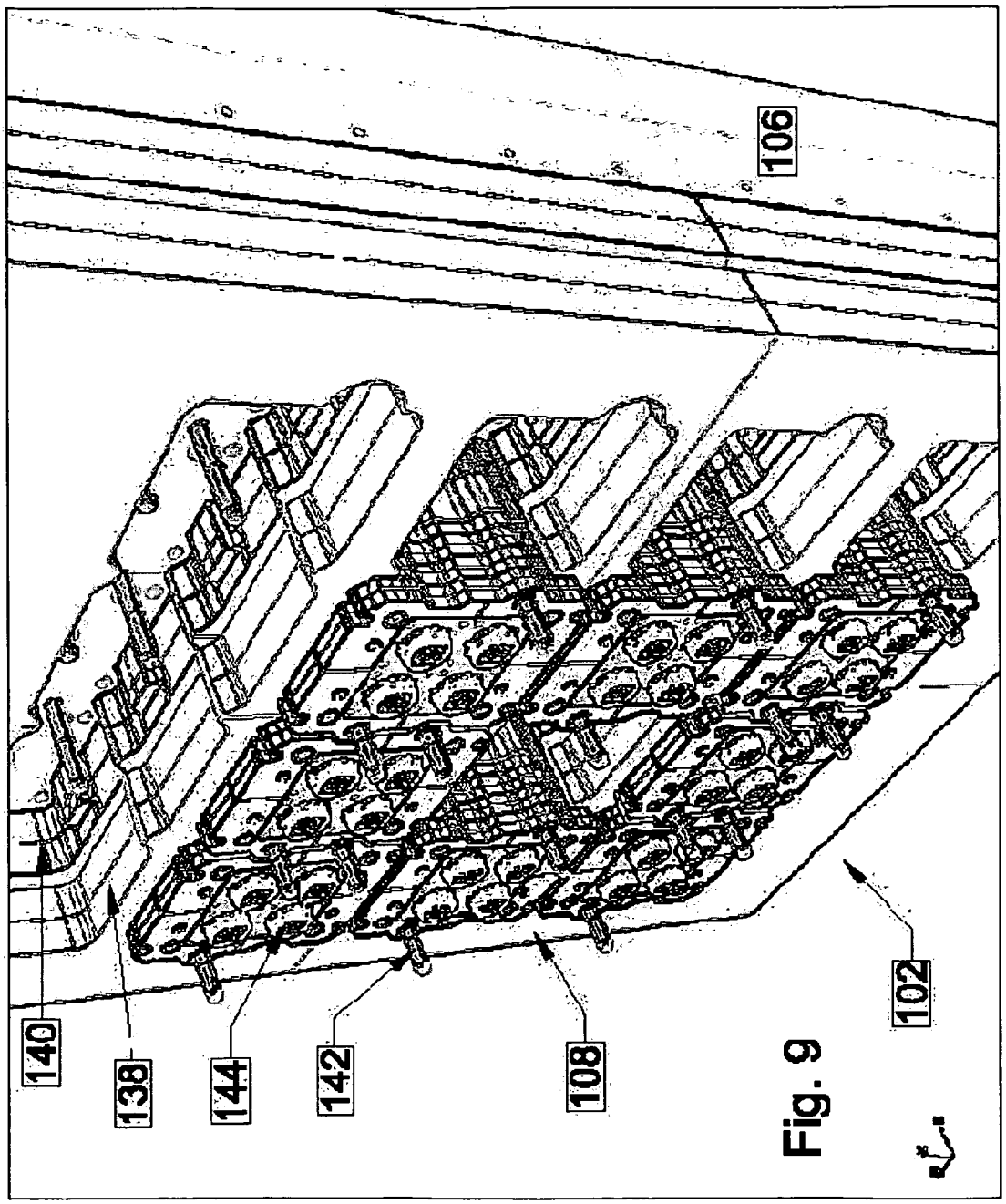

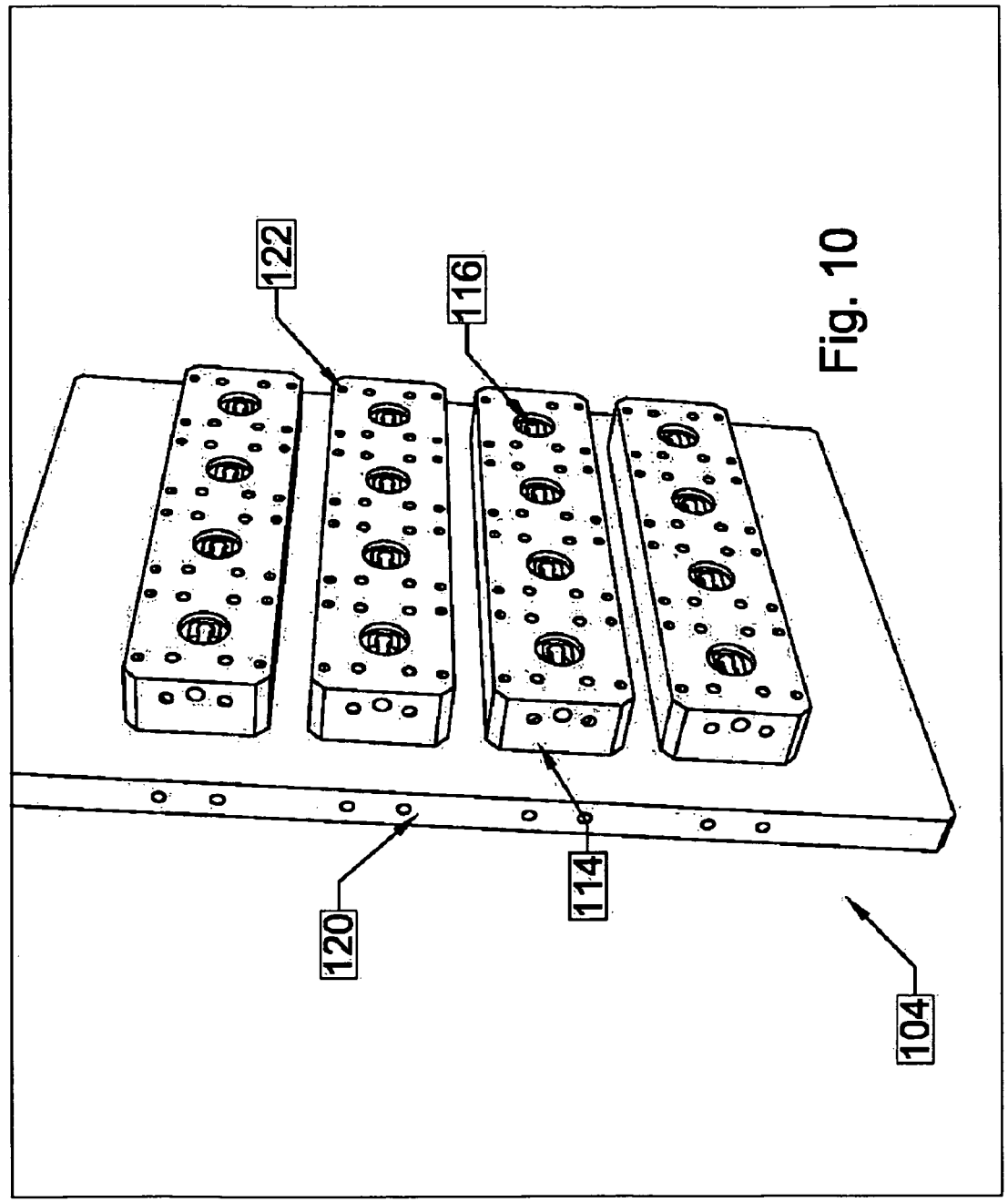

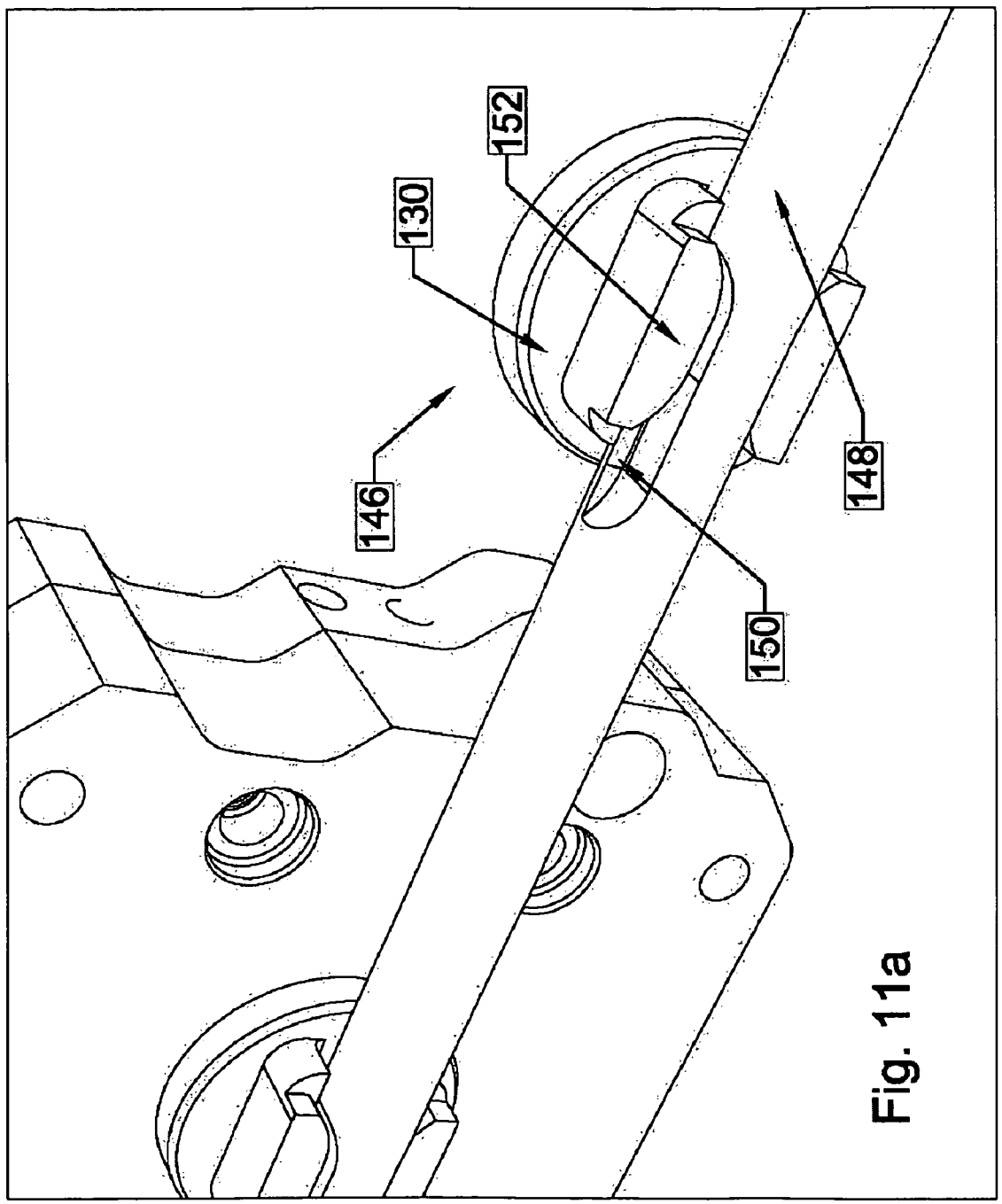

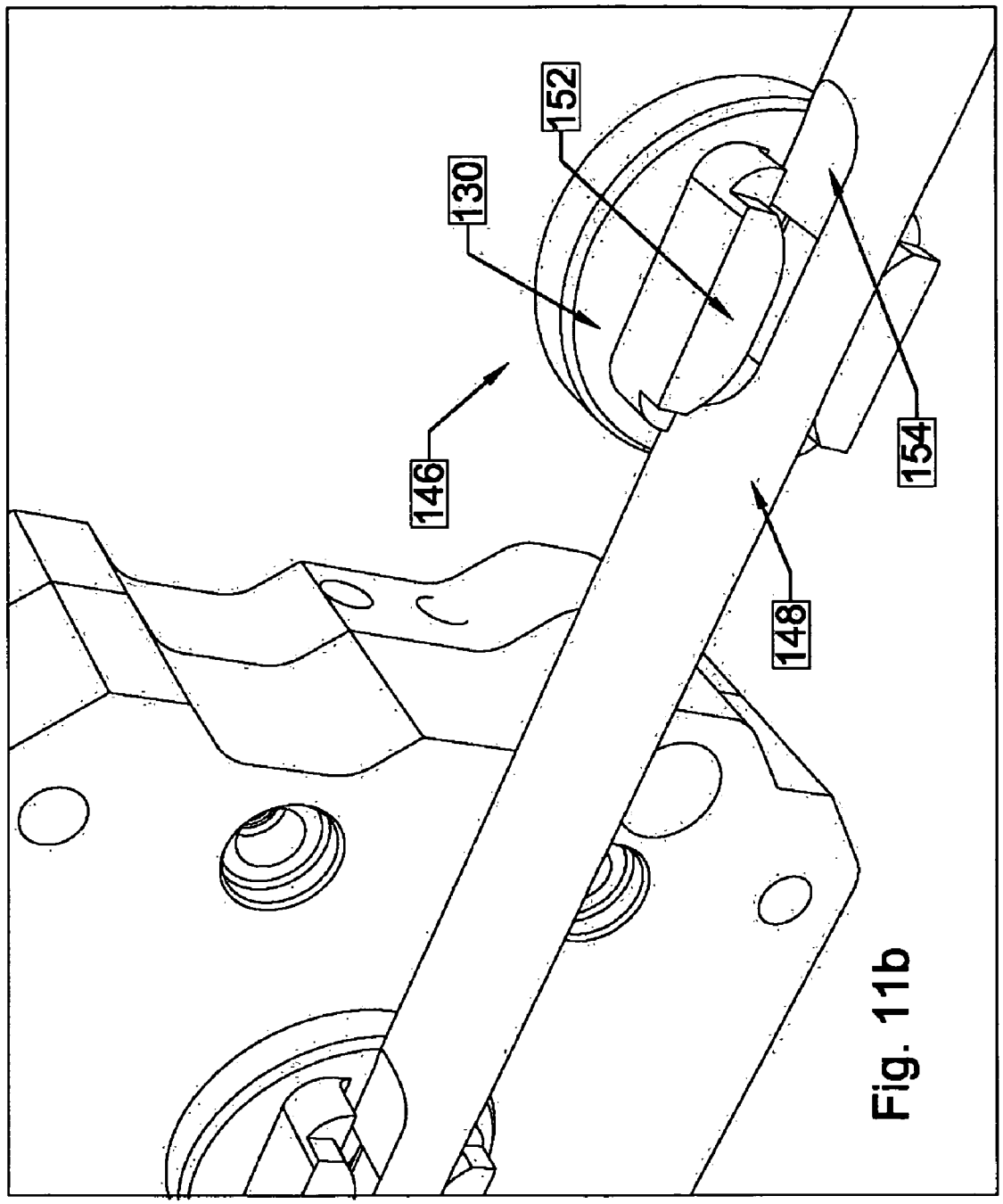

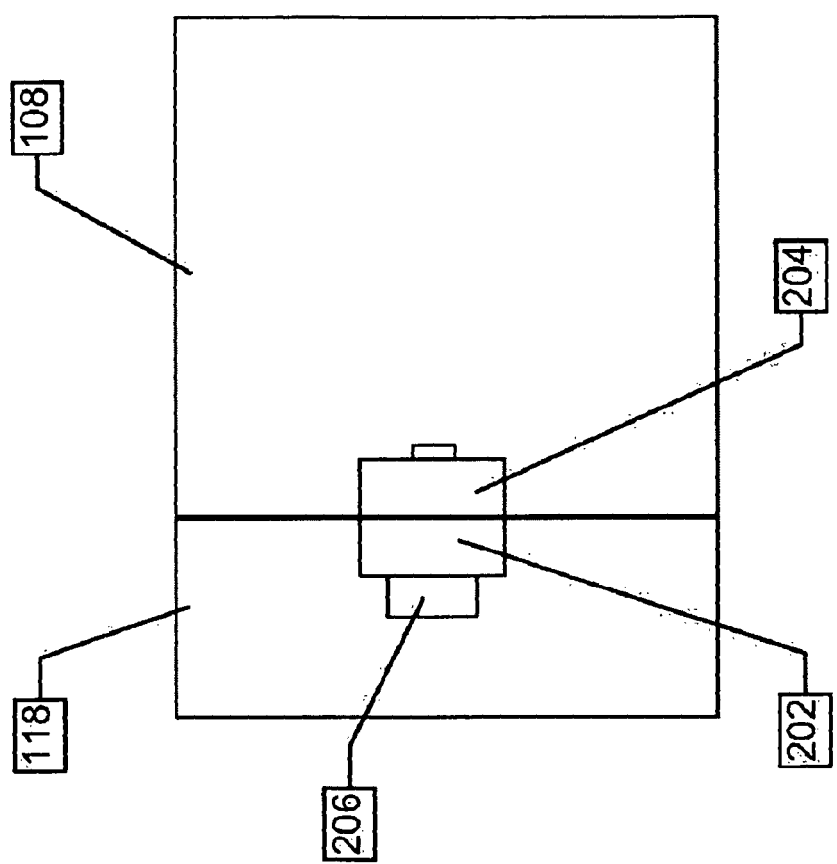

MODULAR MOLD SYSTEM AND RELATED METHOD

TECHNICAL FIELD

The following disclosure relates to injection molding, and more particularly, to modular molds and related methods of using same.

BACKGROUND

In injection molded part production, there are potential problems with cavity malfunction. Such problems can be exasperated in high-volume production. Even if one cavity is down, molding conditions and processing parameters can become unbalanced. If the mold keeps running, say by the operator blocking a malfunctioning stack, the quality and dimensions of the products may be impacted.

Cleaning or replacing a malfunctioning stack may become necessary to ensure part quality. However, extended downtime may be required depending on the construction of the mold. Many times, when one or two mold cavities begin producing bad parts, the entire mold must be removed from the molding machine for maintenance or repair.

SUMMARY

Disclosed herein are multi-nozzle units that may be removed from distributor assemblies while the distributor assemblies remain fastened to platens.

Also disclosed herein are cold-side units associated with removed multi-nozzle units that may be removed and replaced with replacement cold-side units.

BRIEF DESCRIPTION OF THE DRAWING FIGURES

FIG. 9 is another perspective view of the hot half, showing mold plate pockets.

FIG. 10 is another perspective view of the cold half, with the cold-side units removed.

FIGS. 11a and 11b are perspective views showing operation of another exemplary locking mechanism.

FIG. 15 is a schematic view of a latching mechanism.

DETAILED DESCRIPTION

Figure 1:
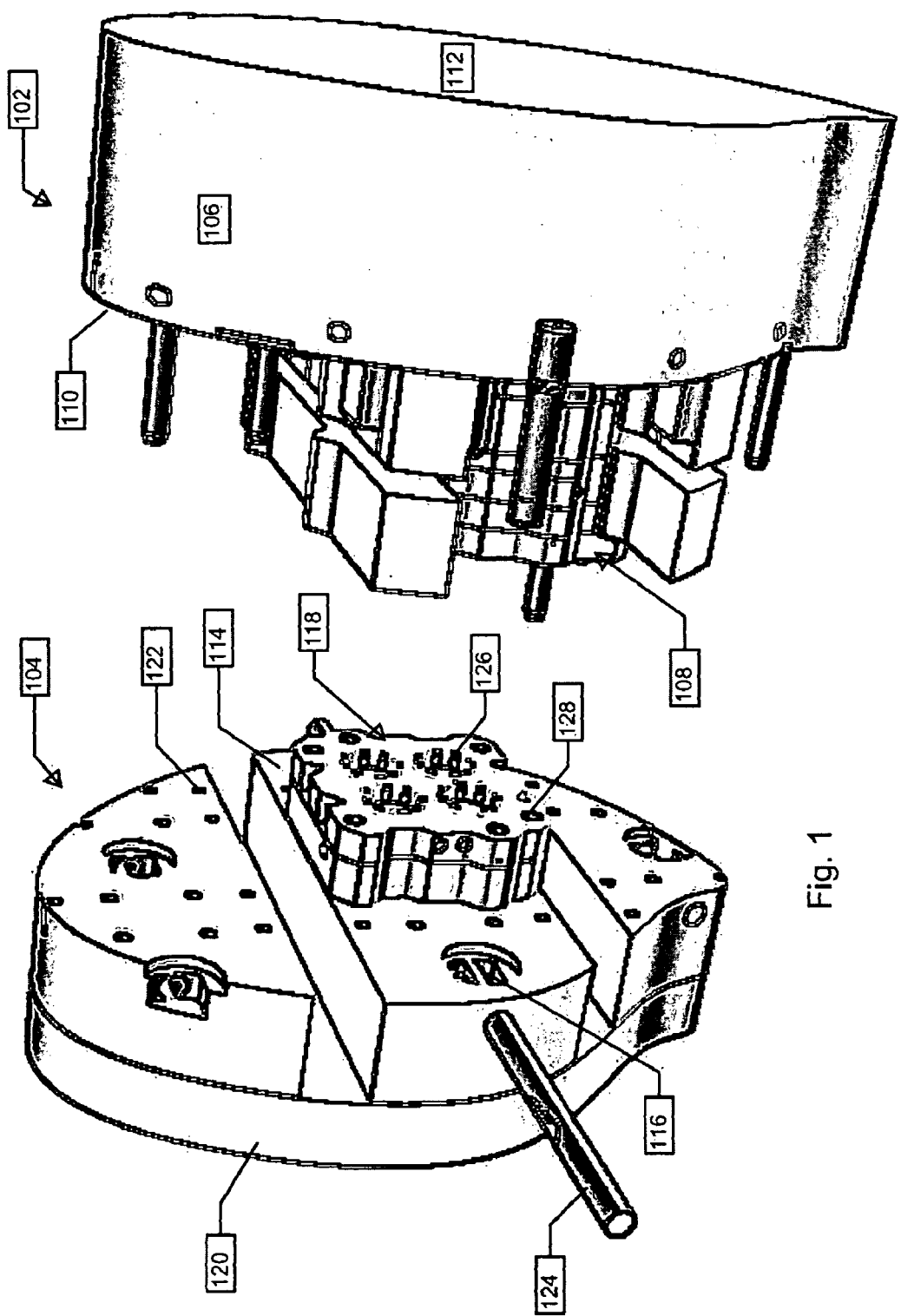
FIG. 1 is a perspective view of a hot half and cold half of a modular mold system separated at a parting line.

FIG. 1 shows an exemplary hot half 102 and cold half 104 of an exemplary modular mold system. The hot half 102 and cold half 104 are shown separated at a parting line. The hot half 102 and cold half 104 together may be called a mold. FIG. 1 has been sectioned and components not necessary for explanation have been omitted from view.

The hot half 102 includes a heated distributor assembly 106 and a plurality of connected heated multi-nozzle units 108 (one shown).

The distributor assembly 106 receives molding material (e.g., pressurized plastic melt) from an injection molding machine (not shown). The distributor assembly 106 defines an internal distributor channel for distributing such molding material. The distributor assembly 106 has a forward side 110 that is opposite a side 112 that faces a first platen (e.g., a stationary platen; not shown) of the injection molding machine. The forward side 100 may also be interchangeably referred to herein as a core side and a cavity side.

The multi-nozzle units 108 can be arranged on the distributor assembly 106 in a grid-like pattern. Each multi-nozzle unit 108 has a manifold and a plurality of forward-extending nozzles defining an internal multi-nozzle unit channel for delivering molding material received from the distributor channel of the distributor assembly 106 to one or more mold cavities. In this embodiment, the multi-nozzle units 108 are identical and interchangeable. The multi-nozzle units 108 are individually forwardly removably fastened to the forward side 110 of the distributor assembly 106 and removable from the distributor assembly 106 while the distributor assembly 106 is fastened to the first platen. The multi-nozzle units 108 may be so fastened to the distributor assembly 106 by bolts. What this means is that each multi-nozzle unit 108 can be removed from the distributor assembly 106 in the direction of the cold half 104. The distributor assembly 106 itself need not be first removed from the first platen, as is conventionally the case. This may allow maintenance of the hot half while the mold is in the press (i.e., while the mold remains fastened to the injection molding machine).

The cold half 104 includes a plurality of mounting plates 114, a plurality of locking mechanisms 116, and a plurality of cold-side units 118 (one shown).

The mounting plates 114 are fastened to a second platen (e.g., moving platen) 120. The mounting plates 114 have bores 122 for fasteners, such as bolts, for fastening the cold-side units 118 thereto. In another embodiment, the functionality of the mounting plates 114 and platen are integrated by, for example, combining them into a single plate.

The locking mechanisms 116 are incorporated into the mounting plates 114 and serve to temporarily hold a cold-side unit 118 to the mounting plate 114 when the cold-side unit 118 is unfastened (e.g., unbolted) from the mounting plate 114. Each locking mechanism 116 includes a locking pin 124, which for illustrative purposes is shown extending from the associated mounting plate 114. (In actual implementation the locking pin 124 may extend much less than shown or not at all.) To achieve this the locking pin 124 has a generally cylindrical cross-section except for portions of engaging and disengaging cross-sections that can be selectively aligned with corresponding portions of each cold-side unit 118. Thus, the locking pin 124 of a particular mounting plate 114 can be actuated to hold or release the cold-side units 118 associated with that particular mounting plate 114. In addition, in this embodiment, the locking pin 124 simultaneously holds or releases an entire row of cold-side units 118.

Each of the cold-side units 118 is associated with one of the multi-nozzle units 108 of the hot half 102 and is engagable with the associated multi-nozzle unit 108 to define one or more mold cavities when the hot half 102 and cold half 104 are brought together to close the mold. In this embodiment, the cold-side unit 118 partially defines four mold cavities via concave mold cavity surfaces 126. Despite whether the associated locking mechanism 116 is actuated to hold or release the cold-side unit 118, each cold-side unit 118 is removably fastened to the mounting plate 114 via fasteners 128, such as bolts. Operation of the locking mechanism 116 is of interest when these fasteners 128 are to be removed.

During normal operation, the mold is closed and opened repeatedly by moving the cold half 104 to the hot half 102 and back again. During each cycle, molding material is injected into the mold cavities defined by the cold half 104 and hot half 102, when the mold is closed, and molded products are ejected from the mold when it is open. When a multi-nozzle unit 108 or cold-side unit 118 is to be replaced for any reason, the below method can be used.

First, the mold is opened the parting line to separate the hot half 102 from the cold half 104, as depicted in FIG. 1

Figure 2:
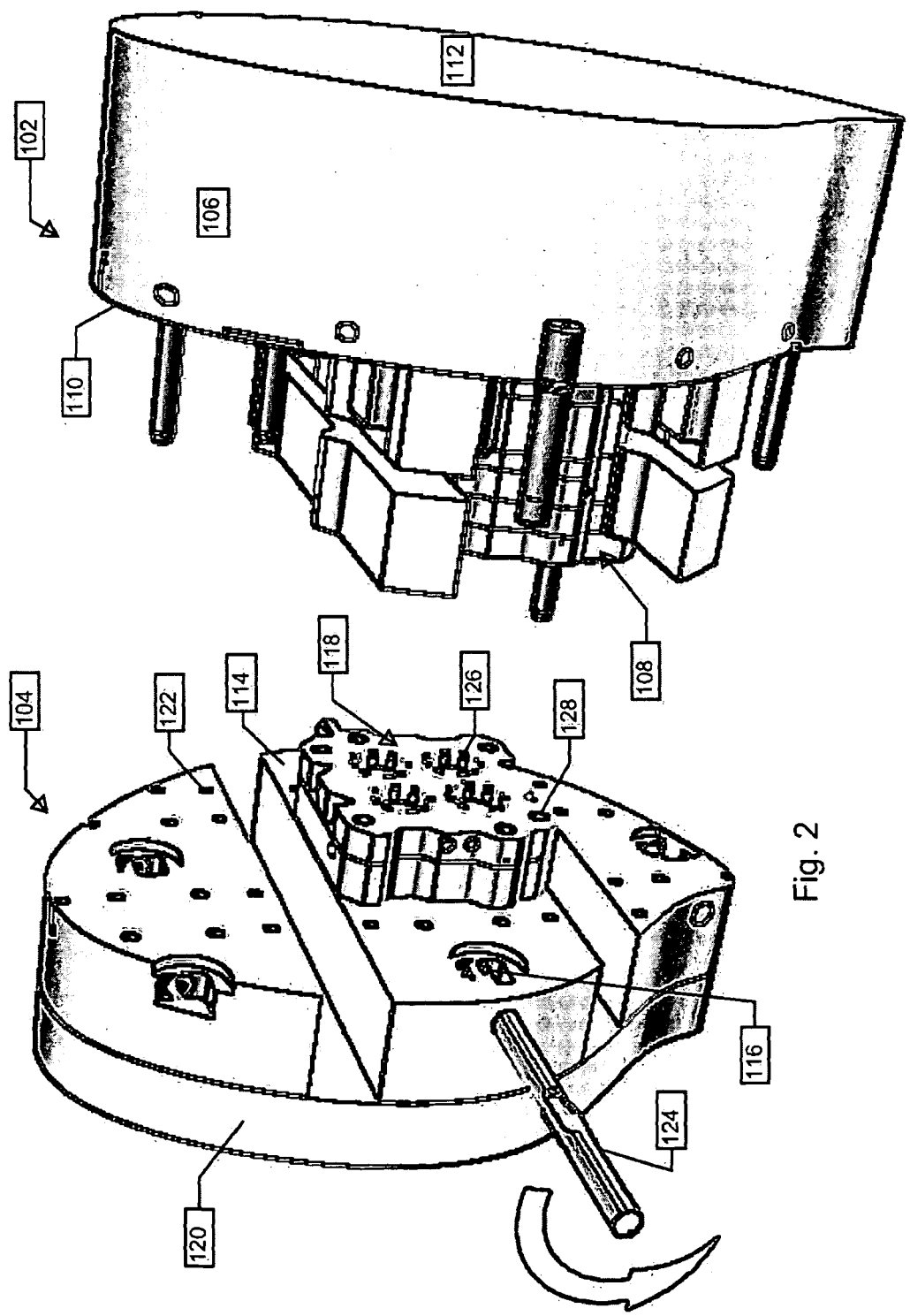
FIG. 2 is a perspective view of a cold-side unit being temporarily locked to a mounting plate.

Next, the cold-side unit 118 to be replaced is temporarily held to the respective mounting plate 114. This is exemplified in FIG. 2, which shows one of the cold-side units 118 being temporarily locked to the mounting plate 114 by turning the locking pin 124 (as indicted by the arrow) of the locking mechanism 116.

Figure 3:
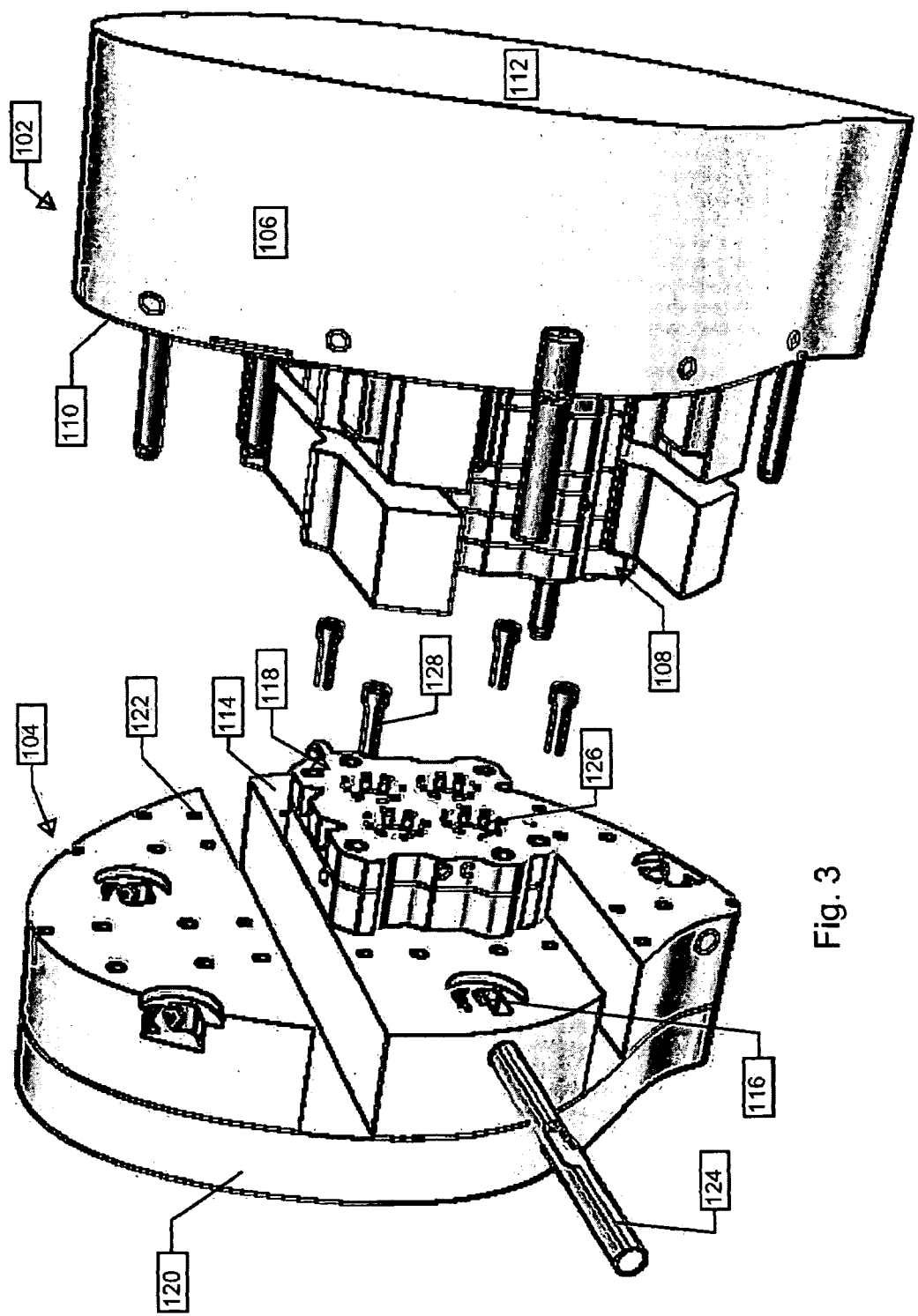
FIG. 3 is a perspective view of the cold-side unit being unbolted from the mounting plate.

Then, the locked cold-side unit 118 is unfastened from the mounting plate 114. As shown in FIG. 3, bolts 128 are removed. The cold-side unit 118 remains held to the mounting plate 114 by the locking mechanism 116.

Figure 4:
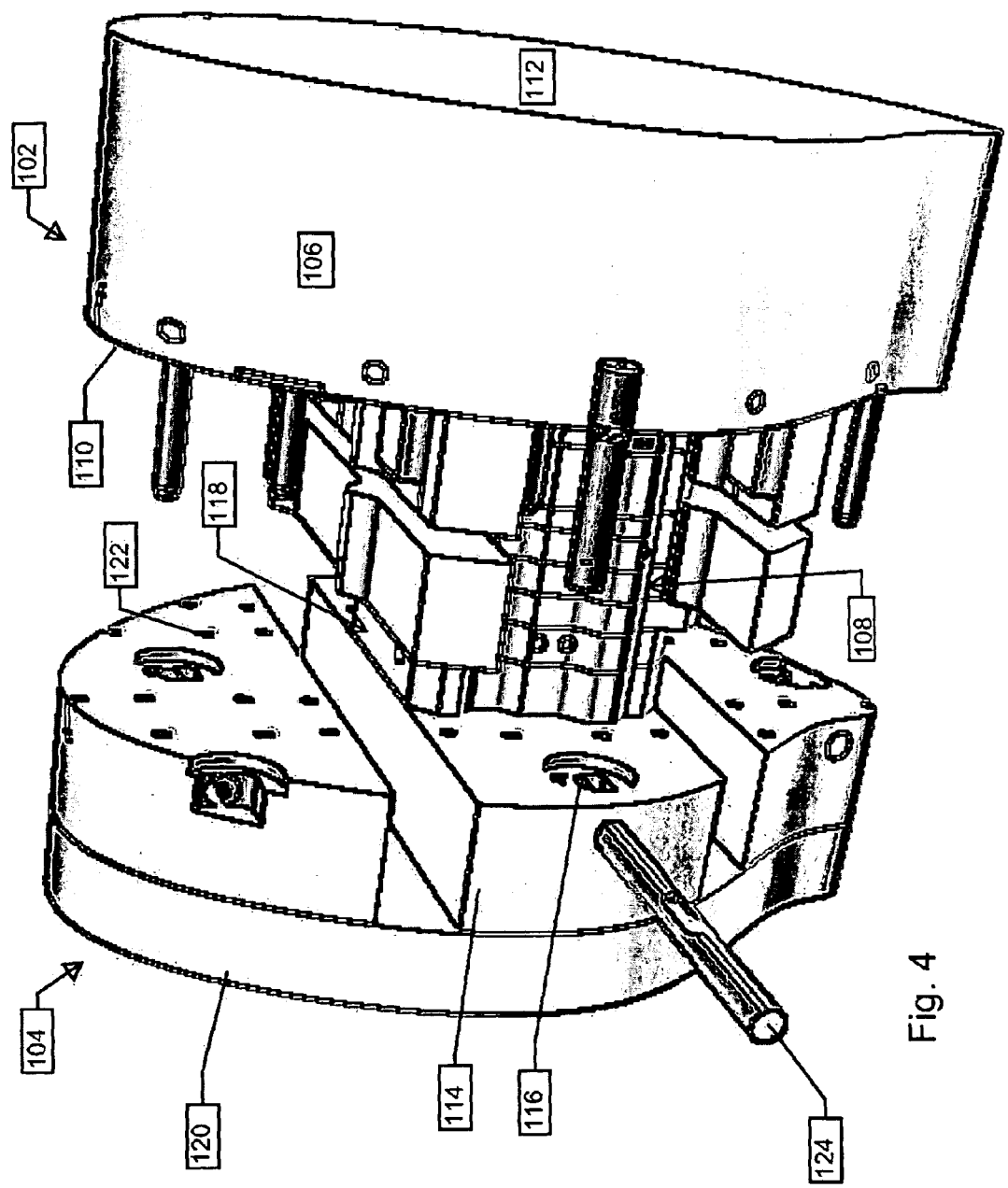
FIG. 4 is a perspective view of the mold closed.

After that, the mold is closed, as shown in FIG. 4. To close the mold, the hot half 102 and cold half 104 are brought together. At this stage, the cold-side unit 118 may be latched to the associated multi-nozzle unit 108. This can be achieved by, for example, bolt-connecting the cold-side unit 118 to the multi-nozzle unit 108.

Figure 5:
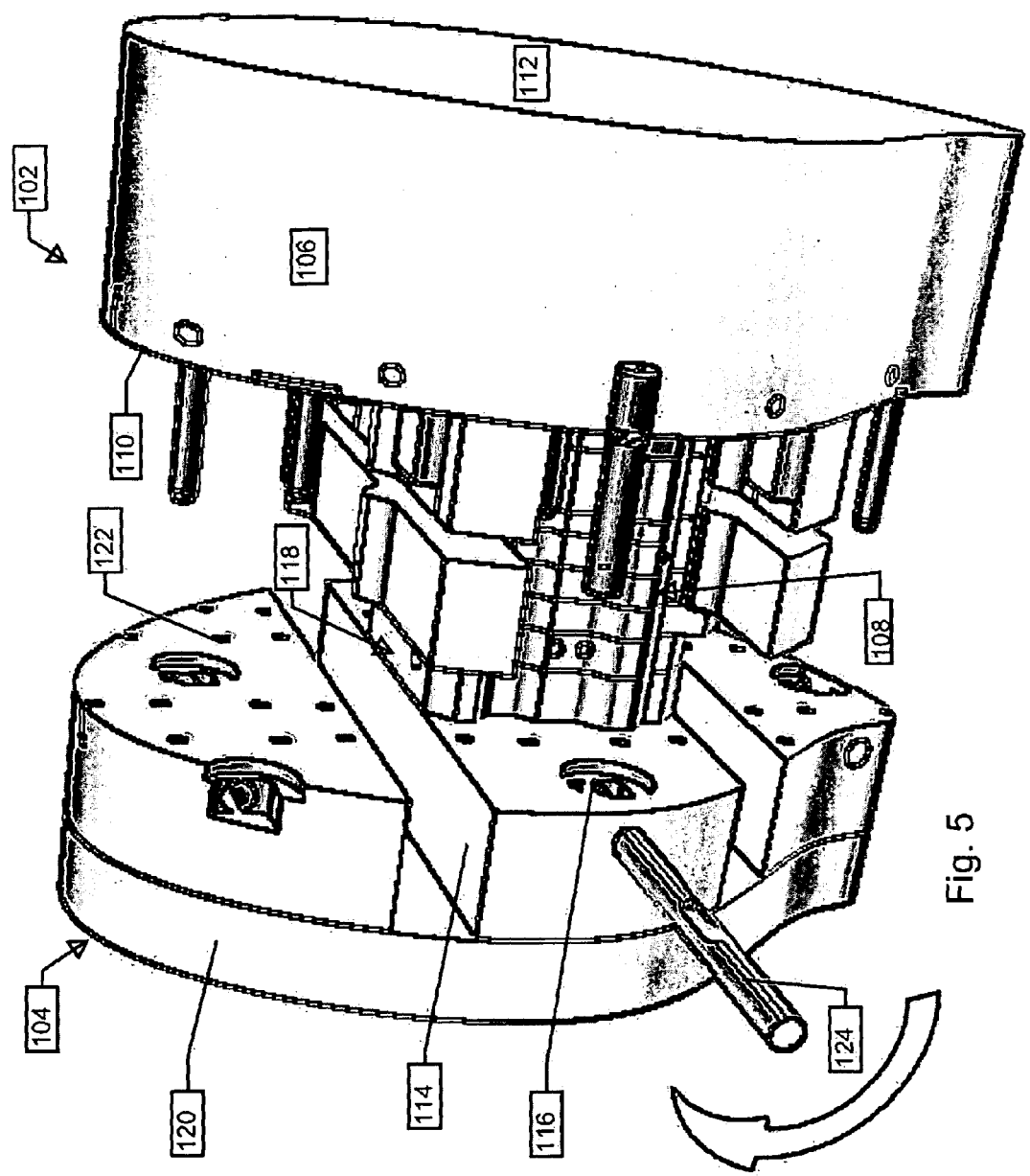
FIG. 5 is a perspective view of the cold-side unit being unlocked from the mounting plate.

Then, the temporary holding of the cold-side unit 118 to the mounting plate is released. As shown in FIG. 5, the locking pin 124 of the locking mechanism 116 is turned to release the cold-side unit 118.

Figure 6:
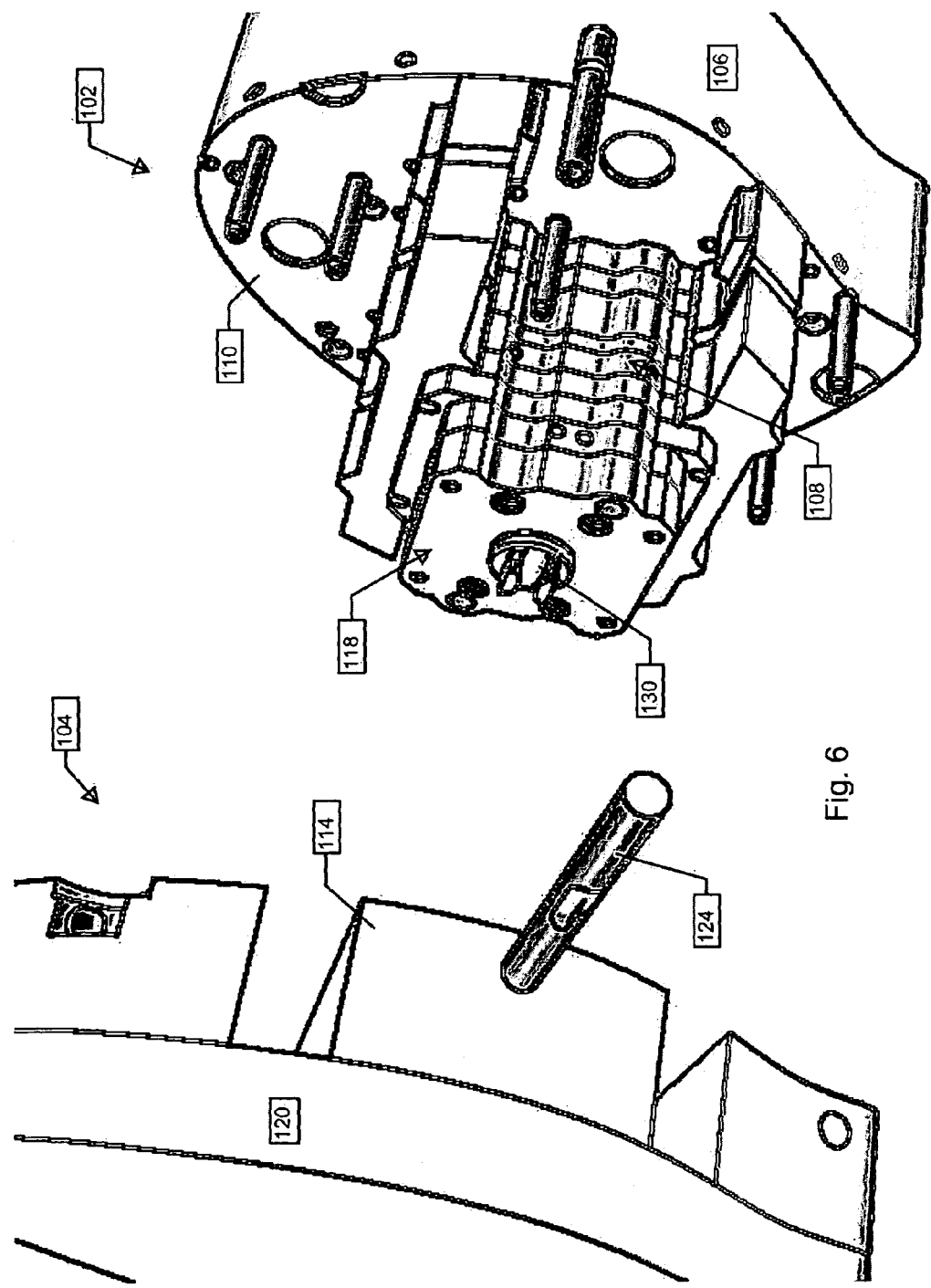
FIG. 6 is a perspective view of the mold opened and the cold-side unit being carried over with the associated multi-nozzle unit on the hot half.

The mold is then opened, as illustrated in FIG. 6. The cold-side unit 118 remains latched to the multi-nozzle unit 108 and is thus separated from the mounting plate 114. Visible in FIG. 6 is a locking channel piece 130 of the cold-side unit 118 for selectively engaging with the locking pin 124 to hold or release the cold-side unit 118 as described above. In this embodiment, the locking channel piece 130 has undercut walls that engage and disengage a complementary shaped cross-section of the locking pin 124.

Figure 7:
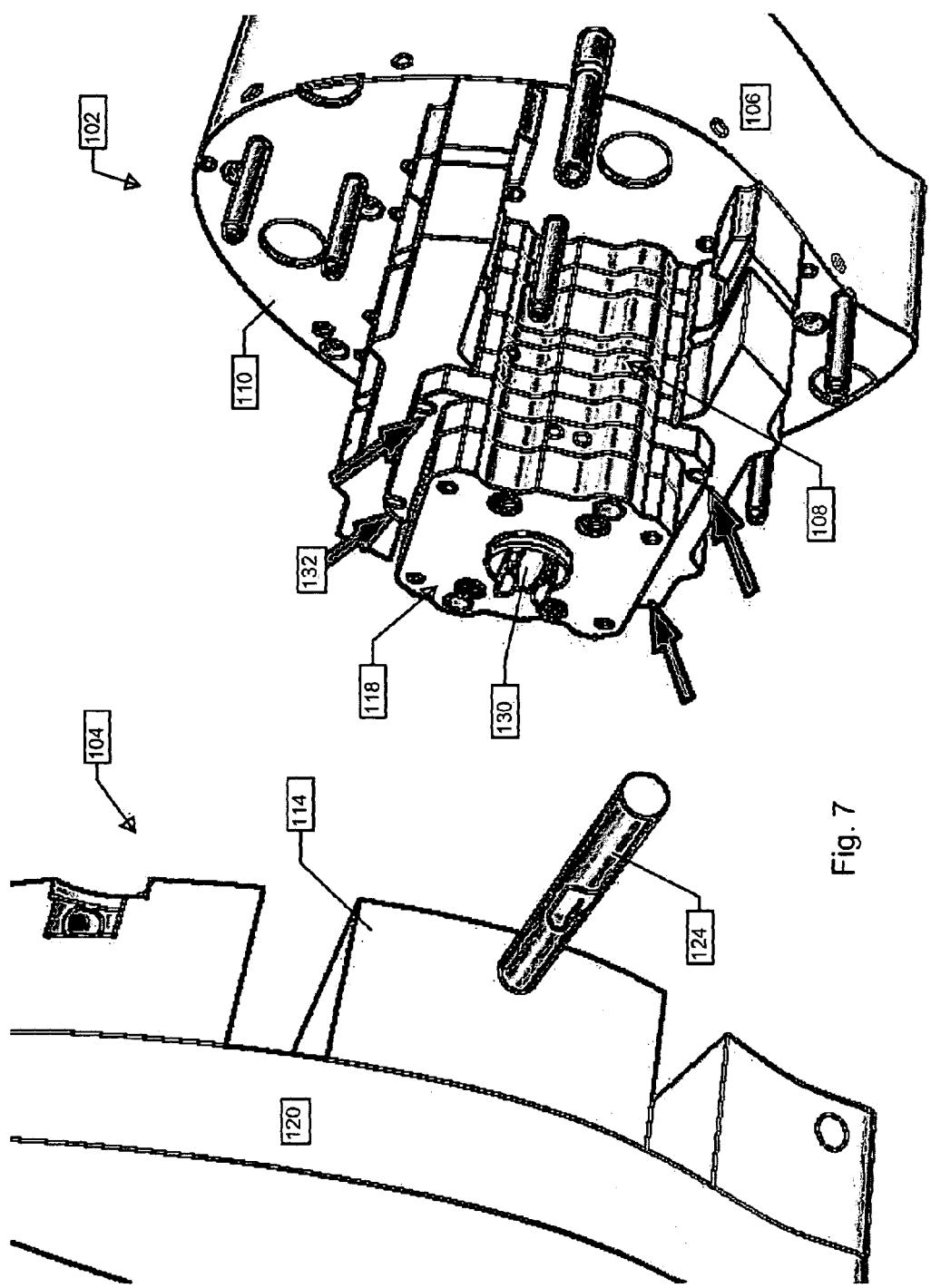
FIG. 7 is a perspective view of removal of bolts that hold the multi-nozzle unit to the distributor assembly.

With reference to FIG. 7, after the mold has been opened, fasteners, such as bolts (as indicated at arrows 132), holding the multi-nozzle unit 108 to the distributor assembly 106 are removed. The combined multi-nozzle unit 108 and cold-side unit 118 remain in place by virtue of the alignment pins discussed below.

Figure 8:
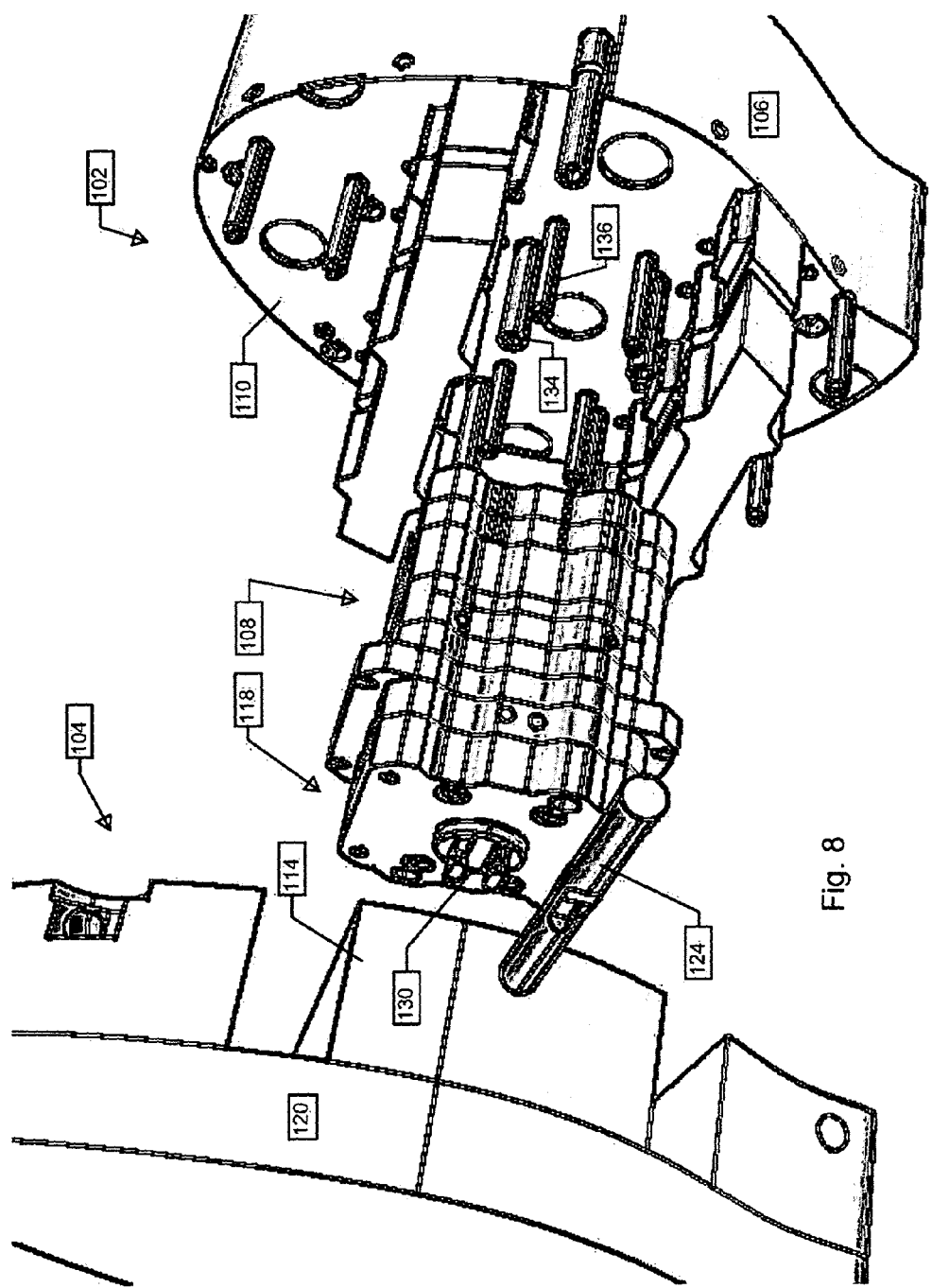
FIG. 8 is a perspective view of the combined multi-nozzle unit and cold-side unit being forwardly removed from a forward side of the distributor assembly while the distributor assembly remains fastened to the platen.

As shown in FIG. 8, the combined multi-nozzle unit 108 and cold-side unit 118 is forwardly removed from the forward side 110 of the distributor assembly 106. This can be done while the distributor assembly 106 remains fastened to the first platen. Revealed in this view are coolant pipes 134 for feeding coolant to the multi-nozzle unit 108 and alignment pins 136 for aligning the multi-nozzle unit 108 to the distributor assembly 106. The coolant pipes 134 and alignment pins 136 protrude from the distributor assembly 106 and mate with respective bores in the multi-nozzle unit 108.

Lastly, the removed combined multi-nozzle unit 108 and cold-side unit 118 can be replaced with a replacement combined multi-nozzle unit and cold-side unit. Replacement may be performed by performing the above method in reverse. This can reduce downtime and the removed multi-nozzle unit 108 and cold-side unit 118 can be repaired when time permits.

The locking and latching, and associated mechanisms may be omitted.

First, the mold is opened at the parting line to separate the hot half 102 from the cold half 104 (see FIG. 1). Next, one of the multi-nozzle units 108 is forwardly removed from the forward side 110 of the distributor assembly 106 by removing bolts (at 132 in FIG. 7), while the distributor assembly 106 remains fastened to the first platen. Then, the removed multi-nozzle unit 108 is replaced with a replacement multi-nozzle unit. At the same time, the associated cold-side unit 118 may also be removed by removing the bolts 128 (as shown in FIG. 3) and replaced by a replacement cold-side unit. Using this method, a multi-nozzle unit 108 or cold-side unit 118 can be removed and replaced alone.

FIG. 9 shows another perspective view of the hot half 102. A stack of mold plates 138 are stacked against the distributor assembly 106 and fastened thereto by bolts, clamps, or similar means. The mold plates 138 define a plurality of pockets 140 for receiving the multi-nozzle units 108. Any number of mold plates 138 can be used. Guide pins 142 protrude from the multi-nozzle units 108 to mate with respective bores of the cold half 104 to guide the back-and-forth movement of the cold half 104 during normal molding operations. Also shown protruding from the forward face of the multi-nozzle units 108 are mold core inserts 144 for defining the mold cavities in conjunction with the mold cavity surfaces 126 of the cold-side units 118.

FIG. 10 shows another perspective view of the cold half 104, with the cold-side units 118 removed.

FIGS. 11a and 11b show operation of another exemplary locking mechanism 146. The locking mechanism 146 operates under a principle similar to that of the locking mechanism 116 described above. One notable difference is that where the locking pin 124 of the locking mechanism 116 is actuated by turning, a locking pin 148 of the locking mechanism 146 is actuated by sliding.

FIG. 11a shows the released position, where the locking mechanism 146 releases the locking channel piece 130 and thus the entire cold-side unit 118. The locking pin 148 is slid (along its length) to a position where a flange 152 of the locking channel piece 130 clears a flange 150 of the locking pin 148.

FIG. 11b shows the held position, where the locking mechanism 146 holds the locking channel piece 130 and thus the entire cold-side unit 118. The locking pin 148 is slid (along its length) to a position where the flange 152 of the locking channel piece 130 abuts the flange 150 (hidden from view) of the locking pin 148. Visible in this view is narrowed portion 154 of the locking pin 148 that allows the flange 152 to pass in the released position.

Figure 12:
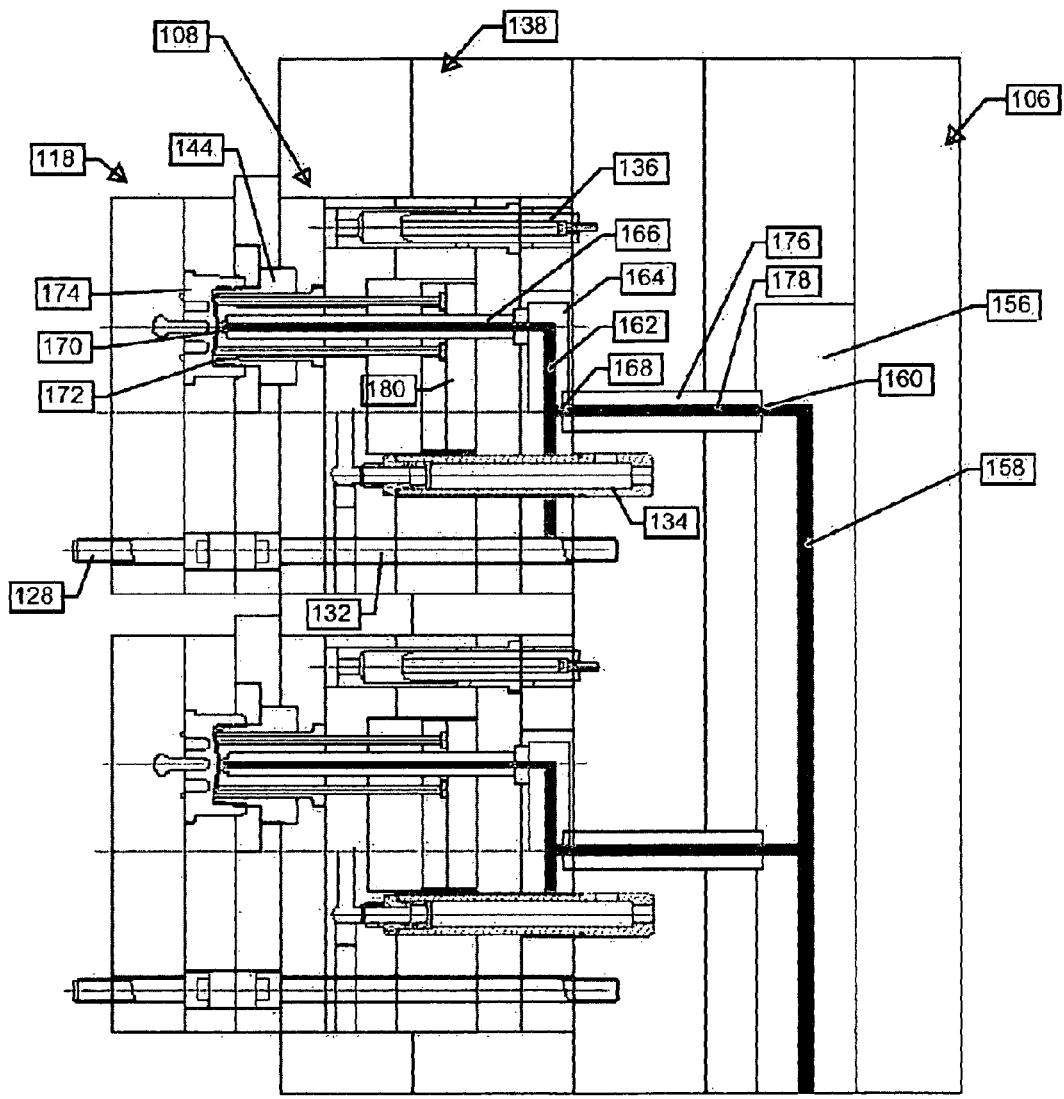
FIG. 12 is a cross-sectional view of multi-nozzle units and surrounding components.

FIG. 12 is a cross-sectional view of multi-nozzle units 108 and surrounding components. Many of the components that have been discussed above are visible and given the same reference numerals.

As can be seen, the distributor assembly 106 has an internal distributor channel 158 defined by a heated manifold 156, such as a hot-runner manifold. The distributor channel 158 has an inlet (off the page) and plurality of outlets 160 for distributing molding material. An inlet component may be further provided to convey molding material from the injection molding machine to the manifold 156. The distributor assembly 106 includes as well the plate or plates that surround and hold the manifold 156 via spacers, pressure disks, or the like. For ease of understanding, the distributor assembly 106 can be likened to a hot half without nozzles.

Each multi-nozzle unit 108 has an internal multi-nozzle unit channel 162 defined by a manifold 164 and a plurality of forward extending nozzles 166 (one shown). The nozzles 166 can be of any number (four, in this embodiment) and can be arranged in any configuration (two-drop, H, X, etc), with the manifold 164 being shaped accordingly. The multi-nozzle unit channel 162 has an inlet 168 in communication with one of the outlets of the distributor channel 160 and a plurality of outlets 170 (at the mold gates) for delivering molding material to mold cavities 172, which are defined by mold core inserts 144 and mold cavity inserts 174 (which define the mold cavity surfaces 126, best shown in FIG. 1). The nozzles 166 and/or manifold 164 include at least one heater and may include at least one thermocouple for regulating temperature. The multi-nozzle unit 108 also includes the plate or plates that surround and hold the manifold 164 and nozzles 166 via spacers, nozzle wells, transfer seals, pressure disks, or the like. For ease of understanding, each multi-nozzle unit 108 can be likened to a hot half.

A plurality of links 176 are provided between the multi-nozzle units 108 and the distributor assembly 106. Each link 176 is fixed to one of the associated multi-nozzle unit 108 and the distributor assembly 106 and slidably inserted into the other of the associated multi-nozzle unit 108 and the distributor assembly 106, such that the entire multi-nozzle unit 108 can be slid away and disconnected from the distributor assembly 106. That is, the link 176 slidably mates with either the multi-nozzle unit 108 or the distributor assembly 106 while remaining fixed (e.g., threaded) to the other. The link 176 may be generally cylindrical and has a link channel 178 for communicating the distributor channel 158 to the multi-nozzle unit channel 162.

Each heated multi-nozzle unit 108 may have an ejection mechanism 180 for ejecting a finished molded part or parts formed in the one or more mold cavities 172. In this embodiment, the ejection mechanism 180 includes a pair of plates that sandwich the heads of several ejector pins that extend forwardly to the mold cavities 172. The ejection mechanism 180 may be actuated by, for example, an external lever that moves the pair of plates. The ejection mechanism 180 may be spring-loaded for automatic return.

Figure 13:
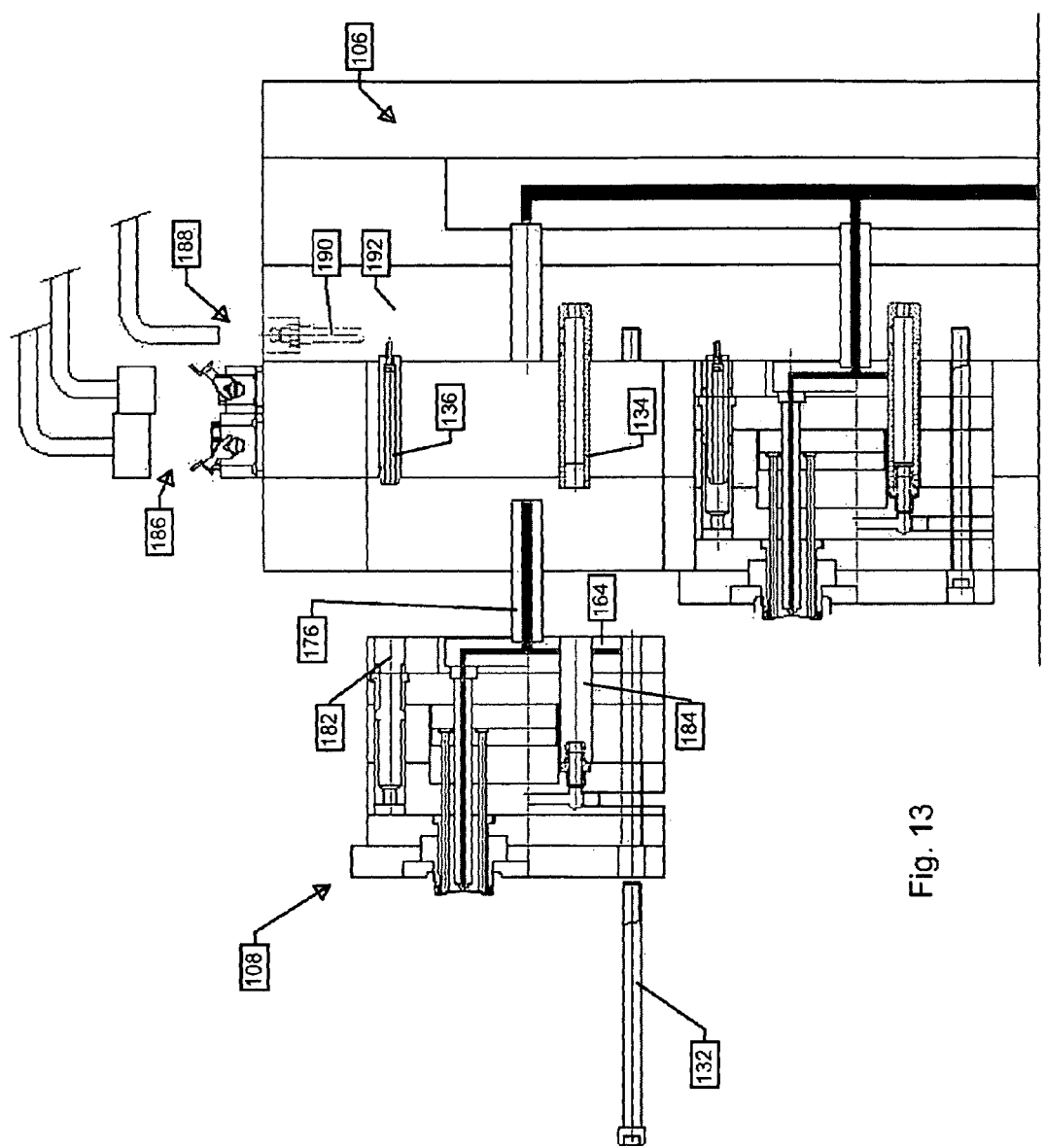
FIG. 13 is a cross-sectional view of a multi-nozzle unit removed from the distributor assembly.

FIG. 13 shows a multi-nozzle unit 108 being removed from the distributor assembly 106. (Some reference numerals from other figures are omitted for clarity.) This is a similar situation to what is depicted in the perspective view of FIG. 8, however, the associated cold-side unit 118 is not shown. Note that when the bolts 132 are removed, the multi-nozzle unit 108 can be removed as a single unit (or as a combined unit when the cold-side unit 118 is latched thereto). In this embodiment, the link 176 is fixed to the manifold 164 of the multi-nozzle unit 108 and so is removed as part of the multi-nozzle unit 108. As can be seen, the alignment pin 136 becomes disengaged from its bore 182 in the multi-nozzle unit 108. Similarly, the coolant pipe 134 exits its bore 184.

Also shown in FIG. 13 are electrical connections 186 and coolant connection 188. Electrical connections 186 provide input electricity for any heaters, sensors, or actuators that require it, as well as leads for sensor signals. Coolant connection 188 provides coolant input/output to a conduit 190 internal to mold plate 192 of the distributor assembly 106. The coolant conduit 190 feeds the coolant pipes 134 and may also feed other tributary conduits and/or pipes.

Figure 14:
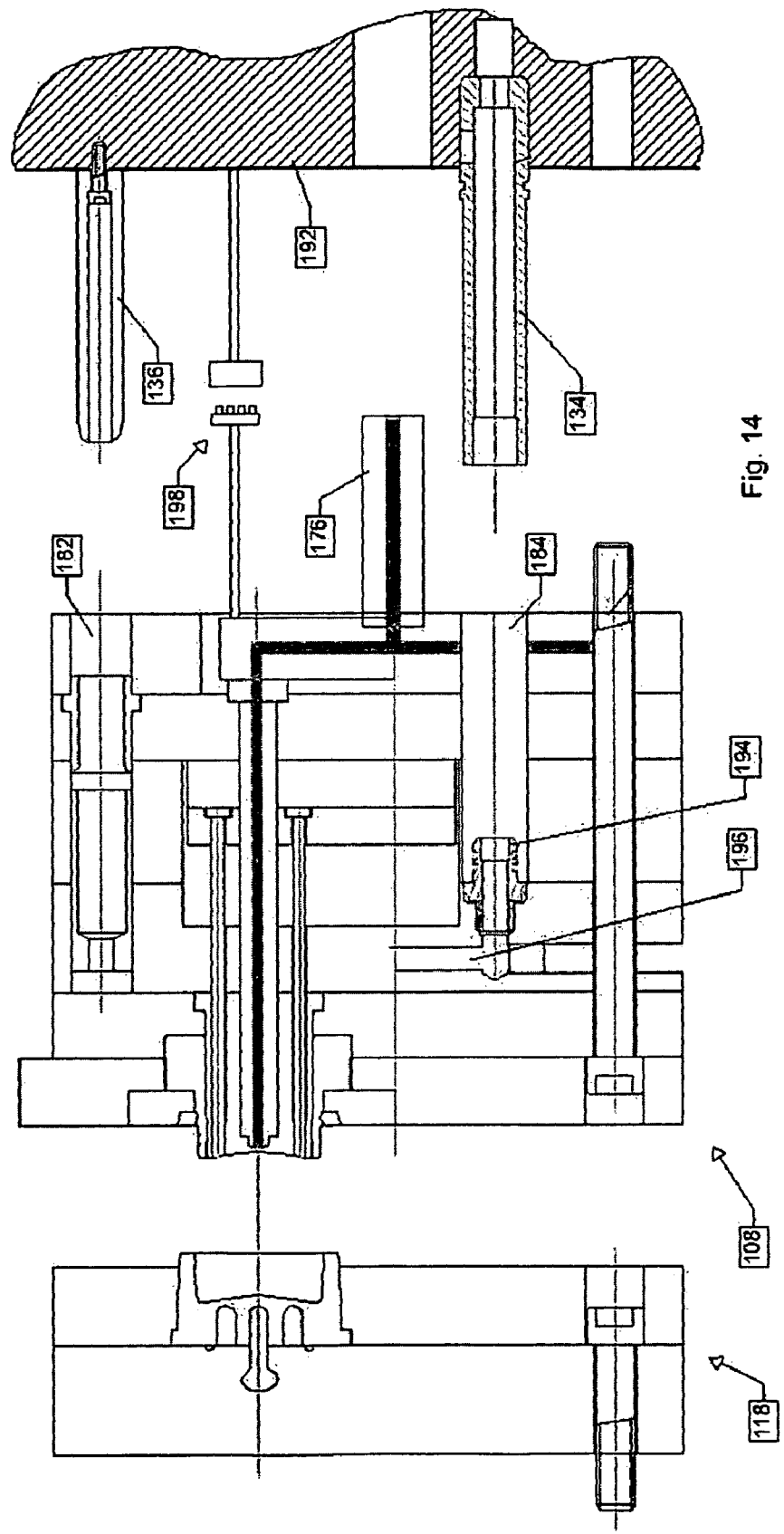
FIG. 14 is a close-up cross-sectional view of a multi-nozzle unit being separated from the distributor assembly.

FIG. 14 is a close-up cross-sectional view of a multi-nozzle unit 108 being separated from the distributor assembly 106. (Some reference numerals from other figures are omitted for clarity.) The cold-side unit 118 is shown separated for convenience. As can be seen, a pipe nipple 194 is provided at the base of the coolant pipe bore 184 to feed coolant channel(s) 196 internal to a plate or plates of the multi-nozzle unit 108. The pipe nipple 194 may have an O-ring for facilitating sealing with the coolant pipe 134.

An electrical quick-connector 198 is provided between electrical leads from the multi-nozzle unit 108 and the distributor assembly 106. The leads coming from the distributor assembly 106 originate at the electrical connections 186 (see FIG. 13). The leads from the multi-nozzle unit 108 terminate at nozzle heaters, a manifold heater, thermocouples, sensors, or any other electrical devices provided to the multi-nozzle unit 108. The electrical quick-connector 198 allows electrical devices in the multi-nozzle unit 108 to be quickly connected or disconnected as the multi-nozzle unit 108 is connected or disconnected from the distributor assembly 106. The leads may be longer than shown and a pocked may be provided for storing them when the multi-nozzle unit 108 is installed. In an equivalent embodiment, the leads are omitted and the halves of the quick-connector 198 are provided directly on the multi-nozzle unit 108 and distributor assembly 106. In such embodiment, the quick-connector 198 is automatically connected or disconnected as the multi-nozzle unit 108 is connected or disconnected from the distributor assembly 106.

FIG. 15 is a schematic view of a latching mechanism for latching a cold-side unit 118 to an associated multi-nozzle unit 108. The latching mechanism includes flanges 202 (one shown) on the cold-side unit 118 and mating flanges 204 (one shown) on the multi-nozzle unit 108. Bolts 206 can be threaded into the flanges 204 to hold the cold-side unit 118 to the multi-nozzle unit 108. The latching mechanism is exemplary.

A modular mold system or portions thereof may be implemented as a "kit of parts." A modular mold system as described in any of the embodiments or examples above can be provided having a predetermined number of heated multi-nozzle units 108 and associated cold-side units 118 for a predetermined number of mold cavities. What this means is that a system may be provided to a customer for a production run of molded parts. A kit of parts system may include at least one additional heated multi-nozzle unit 108 and associated cold-side unit 118 to serve as a replacement or spare. This may enable the user to reduce downtime by swapping out a multi-nozzle unit 108 and/or cold-side unit 118 in need of repair or maintenance with the fresh unit(s) initially provided with the system. The swapped-out multi-nozzle unit 108 and/or cold-side unit 118 can be repaired or maintained by the end user or sent back to the manufacturer for repair, maintenance, replacement, or refurbishment. A modular mold system along with suitable spare multi-nozzle unit(s) and/or associated cold-side unit(s) can be sold and shipped in this manner. In addition, the components of such modular mold system need not be shipped together or provided by the same manufacturer.

Methods and systems have been described with respect to multi-nozzle units that are similar to one other and cold-side units that are similar to one other. This is for ease of understanding, and it should be noted that embodiments employing a multi-nozzle unit or cold-side unit described herein mixed with conventional cavity-defining components are also possible.

Although many embodiments have been described herein, those of skill in the art will appreciate that other variations and modifications may be made without departing from the spirit and scope thereof as defined by the appended claims.

What is claimed is:

1. A modular mold system, comprising:
   a hot half, including,
      a heated distributor assembly to receive molding material from an injection molding machine, wherein the heated distributor assembly defines a distributor channel to distribute the molding material from an inlet to a plurality of outlets, the heated distributor assembly having a forward side that is opposite a side of the heated distributor assembly that faces a first platen of the injection molding machine, and a plurality of heated multi-nozzle units, each multi-nozzle unit having a manifold and a plurality of forward-extending nozzles that define a multi-nozzle unit channel having an inlet in communication with one of the outlets of the distributor channel and having a plurality of outlets to deliver the molding material to one or more mold cavities, wherein each multi-nozzle unit is individually forwardly removably fastened to the forward side of the distributor assembly and removable from the heated distributor assembly while the distributor assembly is fastened to the first platen; and a cold half, including, a mounting plate to fasten to a second platen, and a plurality of cold-side units, each cold-side unit associated with one of the multi-nozzle units, each cold-side unit removably fastened to the mounting plate, each cold-side unit engagable with one of the multi-nozzle units to define the one or more mold cavities when the hot half and cold half are brought together to close the mold;

wherein the cold-side units are latchable to the corresponding multi-nozzle unit during removal.

2. The modular mold system of claim 1, wherein the mounting plate comprises a locking mechanism to temporarily hold one of the cold-side units to the mounting plate when the cold-side unit is unfastened from the mounting plate.

3. The modular mold system of claim 1, wherein each cold-side unit is removably fastened to the mounting plate by bolts.

4. The modular mold system of claim 1, wherein each multi-nozzle unit is fastened to the forward side of the heated distributor assembly by bolts.

5. The modular mold system of claim 1 further comprising a plurality of latching mechanisms to latch a corresponding one of the cold-side units to the associated multi-nozzle unit.

6. The modular mold system of claim 1 further comprising a plurality of links, each link associated with one of the multi-nozzle units, each link being fixed to one of the associated multi-nozzle unit and the heated distributor assembly and slidably inserted into the other of the associated multi-nozzle unit and the distributor assembly, each link having a link channel to communicate the distributor channel to the multi-nozzle unit channel.

7. The modular mold system of claim 1, wherein each heated multi-nozzle unit further comprises an ejection mechanism to eject a molded part or parts formed in the one or more mold cavities.

8. A kit of parts comprising a modular mold system of claim 1 having a predetermined number of heated multi-nozzle units and associated cold-side units corresponding to a predetermined number of mold cavities associated with a production run of molded parts, and at least one additional heated multi-nozzle unit and associated cold-side unit to serve as replacements, wherein the cold-side units are removable from the mold system and latchable to the corresponding multi-nozzle units during removal.

9. A method of using a modular mold system, comprising:

providing a modular mold system having a hot half and a cold half, the hot half having a plurality of heated multi-nozzle units removably fastened to a forward side of a heated distributor assembly, the forward side being opposite a side of the distributor assembly that faces a platen of the injection molding machine, wherein the hot half is configured to deliver molding material to one or more mold cavities, the cold half having a plurality of cold-side units removably fastened to a mounting plate, each cold-side unit associated with one of the multi-nozzle units, wherein the hot half and cold half together define the one or more mold cavities;

opening the mold at a parting line to separate the hot half from the cold half;

forwardly removing one of the multi-nozzle units from the forward side of the heated distributor assembly while the heated distributor assembly remains fastened to the platen; and replacing the multi-nozzle unit with a replacement multi-nozzle unit, including latching the cold-side unit to the multi-nozzle unit during the replacing.

10. The method of claim 9 further comprising:

removing the cold-side unit associated with the removed multi-nozzle unit; and replacing the removed cold-side unit with a replacement cold-side unit.

11. A method of using a modular mold system, comprising:

providing a modular mold system having a hot half and a cold half, the hot half having a plurality of heated multi-nozzle units removably fastened to a forward side of a heated distributor assembly, the forward side being opposite a side of the distributor assembly that faces a platen of the injection molding machine, wherein the hot half is configured to deliver molding material to one or more mold cavities, the cold half having a plurality of cold-side units removably fastened to a mounting plate, each cold-side unit associated with one of the multi-nozzle units, the hot half and cold half together defining the one or more mold cavities;

opening the mold at a parting line to separate the hot half from the cold half;

temporarily holding one of the cold-side units to the mounting plate;

unfastening the locked cold-side unit from the mounting plate;

closing the mold;

latching the cold-side unit to the associated multi-nozzle unit;

releasing the temporary holding of the cold-side unit to the mounting plate;

opening the mold, the cold-side unit remaining latched to the multi-nozzle unit;

forwardly removing the combined multi-nozzle unit and cold-side unit from the forward side of the distributor assembly while the distributor assembly remains fastened to the platen; and replacing the removed combined multi-nozzle unit and cold-side unit with a replacement combined multi-nozzle unit and cold-side unit.

12. The method of claim 11, wherein the temporarily holding one of the cold-side units to the mounting plate includes using a locking mechanism of the cold half.

* * * * *